US005302431A

United States Patent [19]

Schultz

[11] Patent Number: 5,302,431

[45] Date of Patent: Apr. 12, 1994

[54] DEFORMABLE LABEL

[75] Inventor: Marvin I. Schultz, Courtland, Minn.

[73] Assignee: National Poly Products, Inc., Mankato, Minn.

[21] Appl. No.: 817,853

[22] Filed: Jan. 6, 1992

[51] Int. Cl.$^5$ .............................................. B29D 22/00

[52] U.S. Cl. ..................................... 428/35.7; 428/40; 428/343; 428/500; 156/DIG. 19

[58] Field of Search .............. 428/349, 500, 516, 35.7, 428/343, 40; 156/DIG. 19

[56] References Cited

U.S. PATENT DOCUMENTS

| | | | |
|---|---|---|---|
| Re. 32,929 | 5/1989 | Ewing | 428/220 |
| 4,986,866 | 1/1991 | Ohba et al. | 428/172 |

*Primary Examiner*—Edith Buffalow
*Attorney, Agent, or Firm*—Arnold, White & Durkee

[57] ABSTRACT

A deformable label for application to a surface comprises a film containing from about 50 wt. % to about 70 wt. % high density polyethylene; from about 5 wt. % to about 15 wt. % filler; from about 5 wt. % to about 10 wt. % polypropylene or an ionomer resin derived from a copolymer of ethylene and methacrylic acid; and from about 5 wt. % to about 15 wt. % colorant.

20 Claims, 1 Drawing Sheet

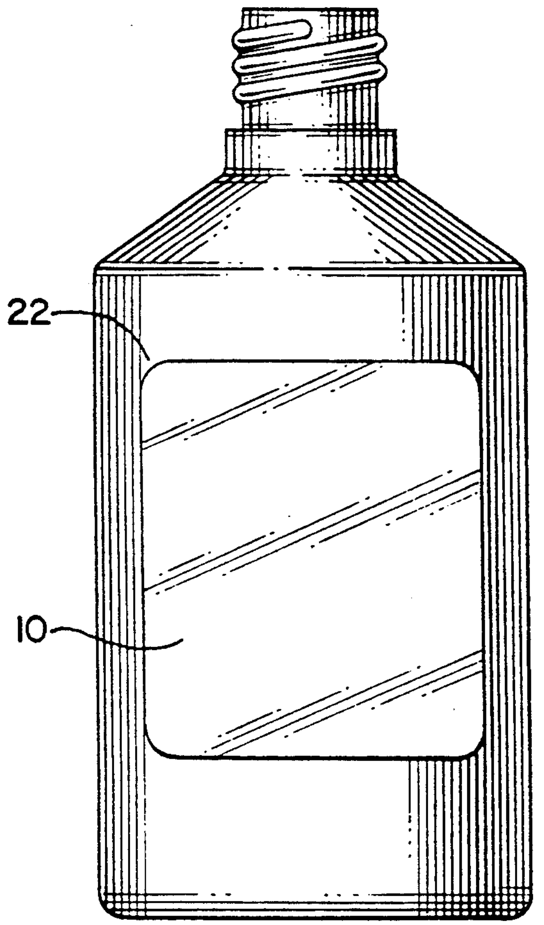
Fig. 2
Fig. 1
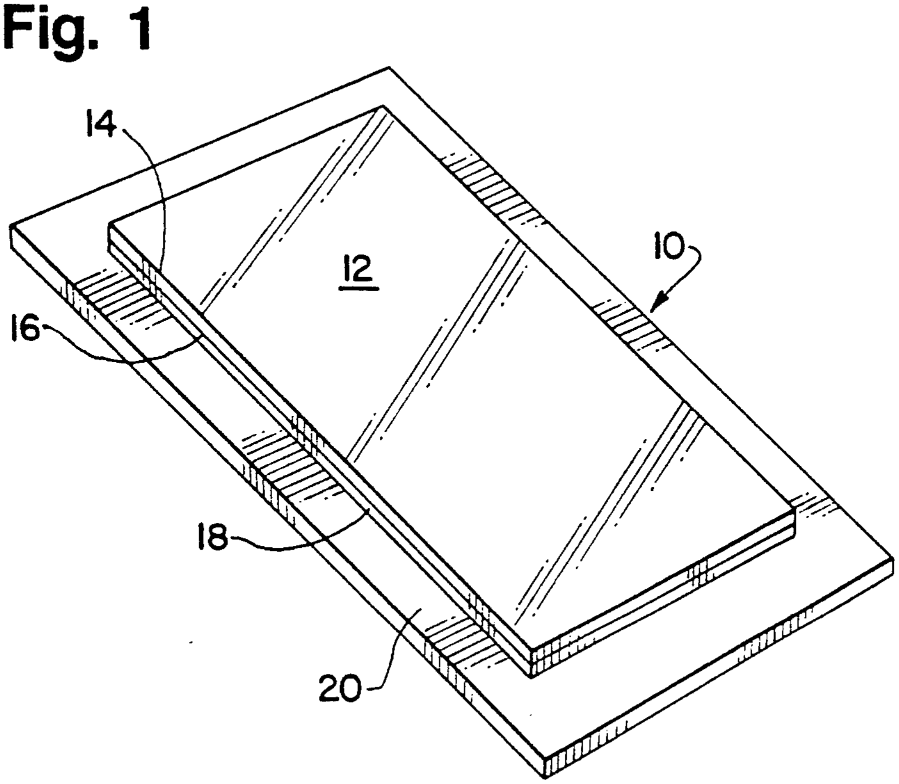

DEFORMABLE LABEL

FIELD OF THE INVENTION

The present invention relates generally to deformable labels for use in decorating and marking squeezeable containers and other flexible packaging materials. This invention particularly relates to such labels formed from high density polyethylene.

BACKGROUND OF THE INVENTION

Plastic containers are used extensively in the packaging industry to contain fluids such as beverages, soaps and oils. These containers are typically formed from polyethylene, polypropylene, polyvinyl chloride, and other flexible plastics. The containers are deformable in that their shape may be changed when a force is applied. When the force is removed, the containers return to their original shape.

Conventional paper labels are not suitable for the plastic containers because such labels cannot expand and contract with the container during hot filling operations or deform during use without wrinkling, tearing, or otherwise damaging the label. Plastic labels made from vinyl or low density polyethylene are available. However, polyvinyl chloride labels are deformable but are not recyclable.

U.S. Pat. No. Re. 32,929 discloses deformable, recyclable labels formed from low and medium density polyethylene. The polyethylene has a density of from about 0.91 $g/cm^3$ to about 0.94 $g/cm^3$, preferably from about 0.915 $g/cm^3$ to about 0.935 $g/cm^3$. Labels formed from high density polyethylene are also described but are not deformable. When applied to a flexible container, the high density polyethylene label wrinkles, lifts, bubbles and creases when the container is squeezed.

The high density polyethylene labels of the present invention are deformable. The labels can expand and contract with the container during hot filling operations and deform during use without wrinkling, tearing, lifting, bubbling, creasing or otherwise damaging the label. The labels die cut easily because of their low elongation in the transverse direction.

The labels of the present invention have several advantages over low or medium density polyethylene labels. High density polyethylene labels withstand more heat during hot filling operations. The labels can be used with packages that contain oily products without decomposing while low or medium density polyethylene labels would soften and eventually decompose. Furthermore, the labels of the present invention are more compatible for recycling since most of the containers on which the labels are applied are made of higher density materials. The labels are also dispensed automatically at a faster rate than low density polyethylene labels because of their stiffness.

SUMMARY OF THE INVENTION

It is an object of this invention to provide a recyclable, high density polyethylene label that is deformable and can expand and contract with a container during hot filling operations without wrinkling, tearing, lifting, bubbling, creasing or otherwise damaging the label.

It is another object of this invention to provide a label that is die cut easily and can withstand thermal and mechanical deformations.

A further object of this invention is to provide a label that can be used with containers that are chemically resistant and can hold oily products without softening or decomposing.

Still another object of the present invention is to provide a label of sufficient stiffness so that the label is quickly removed from its backing material.

Other objects will be apparent to those skilled in the art from the disclosure herein.

In accordance with the present invention, the foregoing objectives are realized by providing a deformable label for application to a surface. The label has a film including from about 50 wt. % to about 70 wt. % high density polyethylene, from about 5 wt. % to about 15 wt. % colorant, from about 5 wt. % to about 10 wt. % polypropylene or an ionomer resin derived from a copolymer of ethylene and methacrylic acid, and from about 5 wt. % to about 15 wt. % filler. The filler is selected from the group consisting of calcium carbonate, mica and talc. The colorant is preferably a white pigment such as titanium dioxide, zinc oxide or zinc sulfide. The label further includes an adhesive to attach the film to a surface. The surface may be a flexible surface such as a wall of a deformable plastic container.

In a preferred embodiment, the deformable label contains from about 50 wt. % to about 70 wt. % high density polyethylene, from about 5 wt. % to about 15 wt. % calcium carbonate, from about 5 wt. % to about 10 wt. % polypropylene, and from about 5 wt. % to about 15 wt. % of a white pigment.

BRIEF DESCRIPTION OF THE DRAWINGS

FIG. 1 is a perspective view of a deformable label embodying the present invention; and FIG. 2 is an elevational view of the label of the present invention applied to a container.

DETAILED DESCRIPTION OF THE INVENTION

While the invention is susceptible to various modifications and alternative forms, a specific embodiment thereof has been shown by way of example in the drawings and will be described in detail. It should be understood, however, that it is not intended to limit the invention to the particular form described, but, on the contrary, the invention is to cover all modifications, equivalents, and alternatives falling within the spirit and scope of the invention as defined by the appended claims.

Turning now to the drawings and referring first to FIG. 1, a label 10 having a film 12 with an upper surface 14 and a lower surface 16 is shown. An adhesive layer 18 is bonded to the lower surface 16 of the film 12. A backing sheet 20 is attached to the adhesive layer 18 by passing the film 12 and the backing sheet 20 through nip rolls to form a label sheet (not shown). The label sheet is die cut so that a plurality of labels will lie in spaced relation on the backing sheet 20. The label 10 is peeled away from the backing sheet 20 in order to apply it to a surface 22 as shown in FIG. 2. While the label may be applied to a wide variety of surfaces, it is preferably applied to a deformable container such as a plastic bottle. The labels are suitable for flexible containers because the labels are deformable and can expand and contract with the container during hot filling operations, handling and use without wrinkling, tearing, lifting, bubbling, creasing or otherwise damaging the label.

The present invention provides a recyclable, deformable, high density polyethylene label for application to a surface. The film 12 of the label 10 contains from about 50 wt. % to about 70 wt. % high density polyethylene, from about 5 wt. % to about 15 wt. % filler, from about 5 wt. % to about 10 wt. % polypropylene or an ionomer resin derived from a copolymer of ethylene and methacrylic acid, and from about 5 wt. % to about 15 wt. % colorant.

The high density polyethylene film has a tensile strength of from about 2600 to about 3500 and a thickness of from about 1.5 to about 7 mils. The density of the film must be from about 0.955 $g/cm^3$ to about 1.20 $g/cm^3$ (25° C.) in order to provide a label of sufficient stiffness to be quickly pulled from the backing sheet by an automatic label dispensing machine. Preferably, the film has a density of from about 0.97 $g/cm^3$ to about 1.20 $g/cm^3$. The most preferred density is from about 0.99 $g/cm^3$ to about 1.10 $g/cm^3$. The film is treated or modified to enhance the ability of the film to accept adhesive and printing. Any conventional process may be used to print on one or both surfaces of the film. A suitable high density polyethylene is Quantum 923.000, sold by Quantum Chemical Corporation of Cincinnati, Ohio.

The filler component of the film is selected from the group consisting of calcium carbonate, mica and talc. Calcium carbonate is preferred in making the labels of the present invention, and is sold as Ampacet 10847 by Ampacet Corporation of Mt. Vernon, N.Y.

The film includes a colorant that may be selected from the wide variety of pigments that are commercially available. The colorant is selected depending upon the intended color and opacity of the label. A white pigment is selected to provide a white, opaque label. Suitable white pigments include titanium dioxide, zinc oxide and zinc sulfide. White Concentrate 11560 and White Concentrate 11078 sold by Ampacet Corporation are preferred colorants. These concentrates contain a carrier polymer and 50 wt. % titanium dioxide. In one preferred embodiment of the invention, from about 18 wt. % to about 30 wt. % of White Concentrate 11560 or White Concentrate 11078 is used in preparing the polyethylene film.

Polypropylene improves the diecuttability of the film because it has a weakness in the machine direction. Other polymers also having a weakness in the machine direction may be substituted for polypropylene. One suitable polymer is Surlyn TM, an ionomer resin derived from a copolymer of ethylene and methacrylic acid and sold by E. I. DuPont de Nemours & Co., Inc. Quantum HC-1510 is a suitable polypropylene sold by Quantum Chemical Corporation.

Preferably, the deformable labels include a film containing from about 50 wt. % to about 70 wt. % high density polyethylene, from about 5 wt. % to about 15 wt. % calcium carbonate, from about 5 wt. % to about 10 wt. % polypropylene, and from about 5 wt. % to about 15 wt. % of a white pigment. Most preferably, the film includes from about 60 wt. % to about 65 wt. % high density polyethylene, from about 8 wt. % to about 12 wt. % calcium carbonate, from about 4 wt. % to about 6 wt. % polypropylene, and from about 10 wt. % to about 12 wt. % of a white pigment. The white pigment may be in the form of a concentrate, such as White Concentrate 11560 or White Concentrate 11078 in an amount of from about 20 wt. % to about 24 wt. % based on the weight of the film.

The adhesive layer of the labels of the present invention is a pressure sensitive adhesive that is elastic after being cured to a permanent set. The adhesive must be capable of permanently bonding the polyethylene film to a surface, and deforming as the surface and the film deform without damaging the label or causing it to separate from the surface. Furthermore, the adhesive must have sufficient clarity and a high level of adhesion and cohesive strength. Adhesives that are suitable in forming the labels of the present invention may be readily determined by one of ordinary skill in the art. These adhesives generally include elastomers such as natural and synthetic rubbers, thermoplastic polymers such as acrylamide, ethylene, propylene, vinyl acetate and vinyl chloride, and other polymers such as polyurethane, polyester, polyamide and silicone. The thickness of the adhesive layer is typically from about 0.1 to about 2 mils.

The film is prepared by admixing the polypropylene or ionomer resin, filler and colorant with high density polyethylene, and extruding the mixture as a film by conventional means. The order of addition is uncritical. The film is corona treated or otherwise modified to enhance acceptability of ink and the adhesive resin. A backing sheet is coated with a suitable release material such as silicone. The backing sheet may be made of paper or another supportive material. After the sheet is coated, it is passed through a conventional curing oven to set the release material and provide a release surface. The release surface is then coated with an adhesive layer by roller coating, spraying, knife-coating or the like. The coated release surface is then cured by conventional means such as heating. The cured sheet is affixed to the film to form the label sheet by passing the sheet and film through nip rolls in a manner that is conventional in the art. The resulting label sheet is die cut to provide individual deformable labels that are spaced from each other on the backing sheet.

Alternatively, the adhesive may be coated on the polyethylene film. The coated film is then cured by conventional means such as heating. The cured film is affixed to the cured release surface of the backing sheet to form the label sheet by passing the sheet and film through nip rolls. The label sheet is then die cut to form a plurality of labels.

The labels of the present invention may be coextruded to include an additional bonding layer formed from a bonding material such as a low density polymer. The label may be used in an "in mold" process where the label is placed in a mold and a container is formed in the mold by blow molding.

The following example is presented to described a preferred embodiment and utility of the present invention and is not meant to limit the present invention unless otherwise stated in the claims appended hereto.

EXAMPLE

A mixture was prepared by blending 63.0 wt. % Quantum 923.000 high density polyethylene, 22.0 wt. % Ampacet White Concentrate 11560, 10.0 wt. % Ampacet 10847, and 5.0 wt. % Quantum HC-1510. A film having a density of 1.08 $g/cm^3$ and a 3 mil thickness was formed from the mixture. The film was corona treated at 40 dyne on both sides to enhance acceptability of ink and the adhesive resin. A paper backing sheet was coated with an adhesive layer and cured. The cured sheet was affixed to the film to form the label by passing the sheet and film through nip rolls in a manner that is conventional in the art. The label was die cut to provide individual deformable labels. The labels were tested to determine their diecuttability, stiffness, and deformability.

A label was applied to the surface of a plastic bottle. The bottle was squeezed using a machine that simulates hand squeezing of bottles. The label was not damaged by the squeeze testing, and showed no wrinkles or looseness.

The diecuttability of the label was determined in comparison to a commercial vinyl label. The label of the present invention had a tensile strength and elongation in the transverse direction of 3200 and 45.8, respectively. The vinyl label had a tensile strength and elongation in the transverse direction of 4000 and 327, respectively. Accordingly, the label of the present invention exhibited superior diecuttability because of its lower transverse direction elongation.

The stiffness of the label was determined by performing a Handle-O-Meter test. The label was suspended in air and weighted until it dropped from its suspended position. The label held 21 grams in its weakest direction, the machine direction.

I claim:

1. A deformable label for application to a surface, wherein the label comprises a film containing from about 50 wt. % to about 70 wt. % high density polyethylene; from about 5 wt. % to about 15 wt. % filler; from about 5 wt. % to about 10 wt. % polypropylene or an ionomer resin derived from a copolymer of ethylene and methacrylic acid; and from about 5 wt. % to about 15 wt. % colorant.

2. The label of claim 1 wherein said film has a density of from about 0.955 g/cm$^3$ to about 1.2 g/cm$^3$.

3. The label of claim 2 wherein said film has a density of from about 1.00 g/cm$^3$ to about 1.10 g/cm$^3$.

4. The label of claim 1 wherein said filler is selected from the group consisting of carbon carbonate, mica and talc.

5. The label of claim 1 wherein said colorant is a white pigment selected from the group consisting of titanium dioxide, zinc oxide and zinc sulfide.

6. The label of claim 1 further including an adhesive layer coated on the film to attach the film to a surface.

7. A deformable label for application to a surface, wherein the label comprises a film containing from about 50 wt. % to about 70 wt. % high density polyethylene; from about 5 wt. % to about 15 wt. % calcium carbonate; from about 5 wt. % to about 10 wt. % polypropylene; and from about 5 wt. % to about 15 wt. % of a white pigment.

8. The label of claim 7 wherein said film has a density of from about 0.955 g/cm$^3$ to about 1.2 g/cm$^3$.

9. The label of claim 8 wherein said film has a density of from about 1.00 g/cm$^3$ to about 1.10 g/cm$^3$.

10. The label of claim 7 further including an adhesive layer coated on the film to attach the film to a surface.

11. A deformable label on a surface, wherein the label comprises a film containing from about 50 wt. % to about 70 wt. % high density polyethylene; from about 5 wt. % to about 15 wt. % filler; from about 5 wt. % to about 10 wt. % polypropylene or an ionomer resin derived from a copolymer of ethylene and methacrylic acid; and from about 5 wt. % to about 15 wt. % colorant.

12. The label of claim 11 wherein said film has a density of from about 0.955 g/cm$^3$ to about 1.2 g/cm$^3$.

13. The label of claim 12 wherein said film has a density of from about 1.00 g/cm$^3$ to about 1.10 g/cm$^3$.

14. The label of claim 11 wherein said filler is selected from the group consisting of calcium carbonate, mica and talc.

15. The label of claim 11 wherein said colorant is a white pigment selected from the group consisting of titanium dioxide, zinc oxide and zinc sulfide.

16. The label of claim 11 further including an adhesive layer coated on the film to attach the film to said surface.

17. The label of claim 16 wherein said surface is flexible.

18. The label of claim 16 wherein said surface is a container.

19. The label of claim 18 wherein said container is plastic.

20. The label of claim 11 wherein said filler is calcium carbonate and said colorant is a white pigment.

* * * * *